(12) United States Patent
Wang et al.

(10) Patent No.: US 8,965,680 B2
(45) Date of Patent: Feb. 24, 2015

(54) SYSTEMS AND METHODS FOR PROVIDING IMPROVED TCAS BEARING MEASUREMENT

(75) Inventors: Guoqing Wang, Beijing (CN); Jianqiang Xuan, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/985,189

(22) PCT Filed: Feb. 25, 2011

(86) PCT No.: PCT/CN2011/000293
§ 371 (c)(1),
(2), (4) Date: Aug. 13, 2013

(87) PCT Pub. No.: WO2012/113101
PCT Pub. Date: Aug. 30, 2012

(65) Prior Publication Data
US 2013/0325314 A1    Dec. 5, 2013

(51) Int. Cl.
*G06F 17/00*    (2006.01)
*G01S 13/04*    (2006.01)
(Continued)

(52) U.S. Cl.
CPC .............. *G08G 5/04* (2013.01); *G01S 13/9303* (2013.01); *H01Q 1/28* (2013.01); *H01Q 3/267* (2013.01); *H01Q 21/20* (2013.01); *H01Q 21/293* (2013.01)
USPC ................. 701/301; 342/29; 342/30; 343/705

(58) Field of Classification Search
USPC ........ 701/3, 10, 14, 300–302; 342/73–74, 82, 342/89, 29–32; 343/700 R, 701, 705, 708
See application file for complete search history.

(56) References Cited

U.S. PATENT DOCUMENTS 5,122,808 A    6/1992    Kyriakos
5,469,172 A    11/1995    Schleder et al.
(Continued)

FOREIGN PATENT DOCUMENTS

CN    101375176 A    2/2009
EP    1901087 A1    3/2008
(Continued)

OTHER PUBLICATIONS

International Preliminary Report on Patentability of international application No. PCT/CN2011/000293, dated Aug. 27, 2013, 5 pp.
(Continued)

*Primary Examiner* — Yonel Beaulieu
(74) *Attorney, Agent, or Firm* — Shumaker & Sieffert, P.A.

(57) ABSTRACT

Systems and methods for improving bearing accuracy in a Traffic Collision Avoidance System (TCAS) environment. An interrogation signal is transmitted from an array of antenna elements. A response to the transmitted interrogation signal from a target is received at a first pair of elements of the array. The first pair of elements is separated by at most ½λ of the response signal. A processor determines coarse bearing of the received response. A second pair of elements of the array of antenna elements receives a response to the interrogation signal. The second pair of elements is separated by approximately Nλ of the response signal. N is an integer not equal to zero. A first bearing value to the target is determined based on the determined coarse bearing and the received response at the second pair of elements. The array is mounted on an aircraft or on a ground installation.

20 Claims, 5 Drawing Sheets

(51) Int. Cl.
*G08G 5/04* (2006.01)
*G01S 13/93* (2006.01)
*H01Q 1/28* (2006.01)
*H01Q 3/26* (2006.01)
*H01Q 21/20* (2006.01)
*H01Q 21/29* (2006.01)

(56) References Cited

U.S. PATENT DOCUMENTS

| | | | |
|---|---|---|---|
| 6,169,519 B1 * | 1/2001 | Holecek et al. | 342/442 |
| 6,222,480 B1 * | 4/2001 | Kuntman et al. | 342/30 |
| 6,285,313 B1 * | 9/2001 | Wahab et al. | 342/174 |
| 6,392,598 B1 * | 5/2002 | Jones et al. | 342/442 |
| 7,006,032 B2 * | 2/2006 | King et al. | 342/29 |
| 7,380,455 B2 | 6/2008 | Workman | |
| 7,436,350 B1 | 10/2008 | Maloratsky et al. | |
| 7,439,901 B2 * | 10/2008 | Needham et al. | 342/30 |
| 7,576,686 B2 * | 8/2009 | Needham et al. | 342/174 |
| 7,825,858 B2 * | 11/2010 | Blessing et al. | 342/442 |
| 2006/0267829 A1 | 11/2006 | Brandao et al. | |

FOREIGN PATENT DOCUMENTS

| | | |
|---|---|---|
| WO | 8904002 A2 | 5/1989 |
| WO | 2010009906 A1 | 1/2010 |

OTHER PUBLICATIONS

International Search Report of international application No. PCT/CN2011/000293, dated Jul. 7, 2011, 4 pp.
International Written Opinion of international application No. PCT/CN2011/000293, dated Jul. 7, 2011, 4 pp.
First Office Action, and translation thereof, from Counterpart Chinese Patent Application No. 201180068474.4, dated Aug. 22, 2014, 14 pp.

* cited by examiner

SYSTEMS AND METHODS FOR PROVIDING IMPROVED TCAS BEARING MEASUREMENT

BACKGROUND OF THE INVENTION

Currently, Traffic Collision Avoidance System (TCAS) bearing is determined from a TCAS interrogation response signal, by a 4-element antenna array. The elements are spaced equally about the circumference of the antenna array, geometrically at 90-degree intervals. The relative bearing is determined by measuring the phase difference of the response signal between opposite element pairs.

The length between opposite elements is short (within ½ wave length of the 1090 MHz XPDR signal), thus the TCAS bearing measurements are vulnerable to noise and susceptible to coupling. Thus, TCAS II (recommends evasive maneuvers) bearing measurement can be inaccurate. Usually, the error is no more than 5 degrees but it can be greater than 30 degrees. The low bearing accuracy introduces a large uncertainty in the TCAS position that increases with range. Thus, a displayed TCAS target symbol can appear to jump, due to these errors/inaccuracies.

SUMMARY OF THE INVENTION

The invention includes systems and methods for improving bearing accuracy in a Traffic Collision Avoidance System (TCAS) environment. In an exemplary method an interrogation signal is transmitted from an array of antenna elements. A response to the transmitted interrogation signal from a target is received at a first pair of elements of the array of antenna elements. The first pair of elements are separated by at most $\frac{1}{2}\lambda$ of the response signal. A processor determines coarse bearing of the received response. A second pair of elements of the array of antenna elements receives a response to the transmitted interrogation signal. The second pair of elements is separated by approximately $N\lambda$ of the response signal. N is an integer not equal to zero. A first bearing value for the target is determined based on the determined coarse bearing and the received response at the second pair of elements.

In other aspects of the invention, the array of antenna elements is mounted on an aircraft or on a ground installation.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
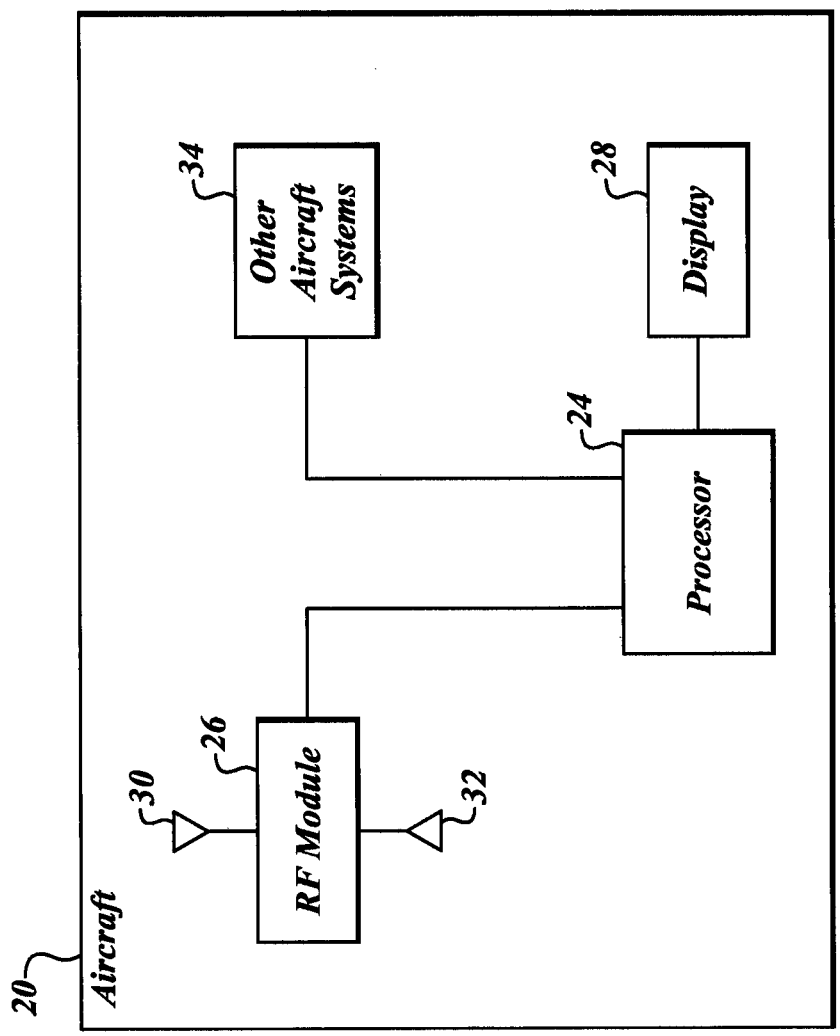
FIG. 1 is a schematic diagram of an exemplary system located aboard an aircraft as formed in accordance with the present invention.

FIG. 1 illustrates an aircraft 20 that includes a traffic collision and avoidance system (TCAS) formed in accordance with an embodiment of the present invention. The TCAS includes a TCAS processor 24 that is in signal communication with a RF Module 26, a display 28 (or other output device), and other aircraft systems 34, such as an air data system (ADS), a flight management system (FMS) or a global positioning system (GPS). The RF Module 26 is attached to a first four-element antenna 30 that is located on top of the aircraft 20 and a second four-element antenna 32 that is located on the bottom of the aircraft 20.

In one embodiment, the aircraft 20 includes only one of the two four-element antennas 30, 32. The TCAS processor 24 reduces error in a more accurate bearing value produced by a first pair of the four-element antenna using information associated with a coarse bearing value determined by the other three elements (two pairs) of the four element antenna 30, 32. Thus, a highly accurate bearing is produced using only a single four-element antenna 30, 32. Further errors may be reduced by using both top and bottom four-element antennas 30, 32. This will be described in more detail below.

Figure 2:
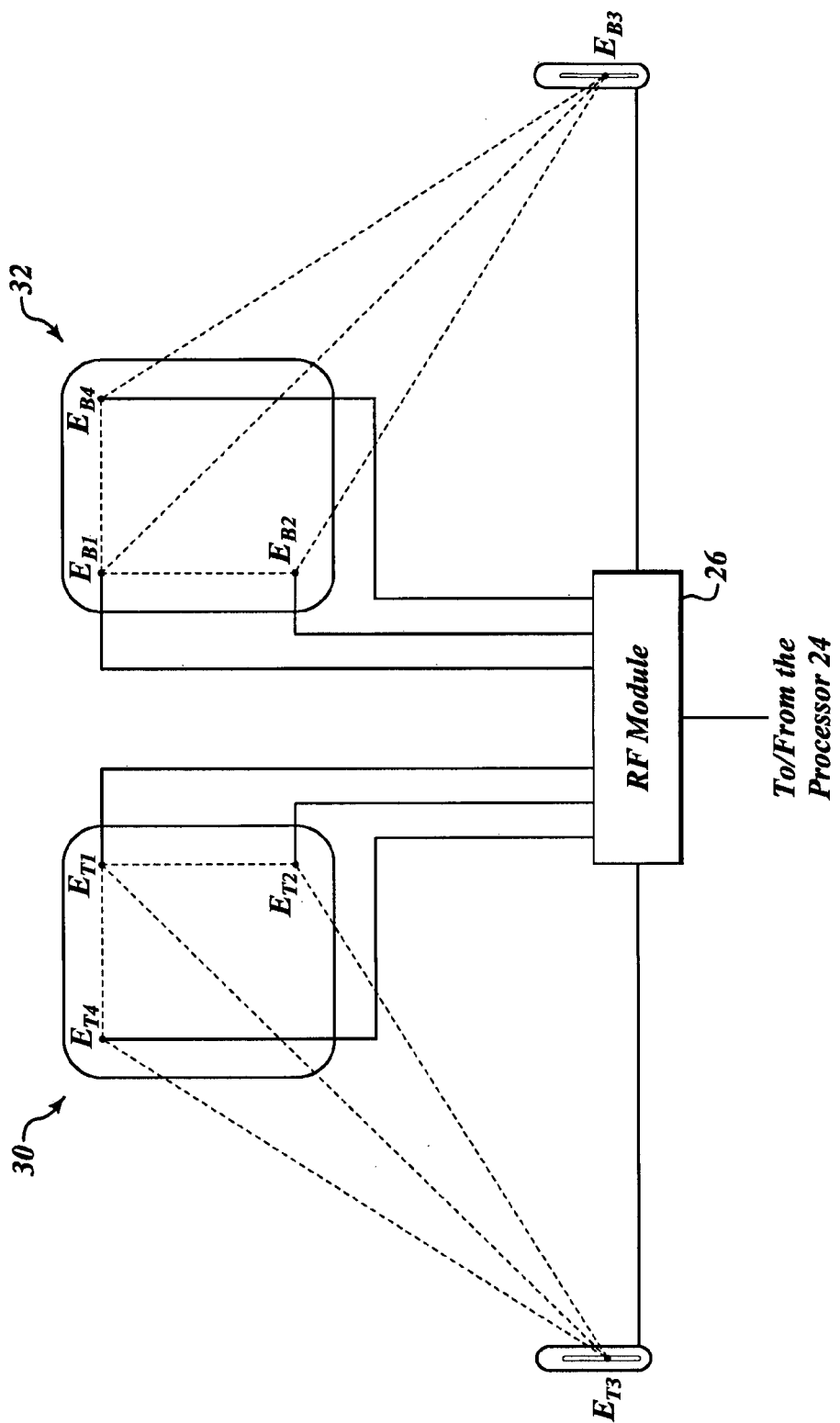
FIG. 2 illustrates antenna configuration for the system shown in FIG. 1.

FIG. 2 illustrates a sample configuration of the top and bottom four-element antennas 30, 32. All of the elements of both antennas 30, 32 are attached to RF Module 26, which is in communication with the TCAS processor 24.

The spacing between top antenna elements $E_{T1}$, $E_{T2}$ and $E_{T1}$, $E_{T4}$ is identical ($\frac{1}{2}\lambda$ or less). $\lambda$ is the wavelength of XPDR response signal carrier in 1090 MHz. Lines connecting $E_{T1}$, $E_{T2}$ and $E_{T1}$, $E_{T4}$ are perpendicular to each other. In one embodiment, the elements $E_{T1}$, $E_{T2}$, and $E_{T4}$ are integrated into one directional antenna and $E_{T3}$ is an omniblade antenna. $E_{T3}$ is located $N\lambda$ spacing to $E_{T1}$, and has the same spacing to $E_{T2}$ and $E_{T4}$.

The bottom antenna elements have the similar setup with the top elements, and with axes determined by $E_{T1}$, $E_{T3}$ and $E_{B1}$, $E_{B3}$ that are perpendicular to each other.

In this configuration, frequency drift introduced error, and elevation angle error contributed by attitude, range and altitude errors can be removed from fine bearing by utilizing perpendicular unambiguous determination of $\phi_{T13}$ and $\phi_{B13}$.

Figure 3:
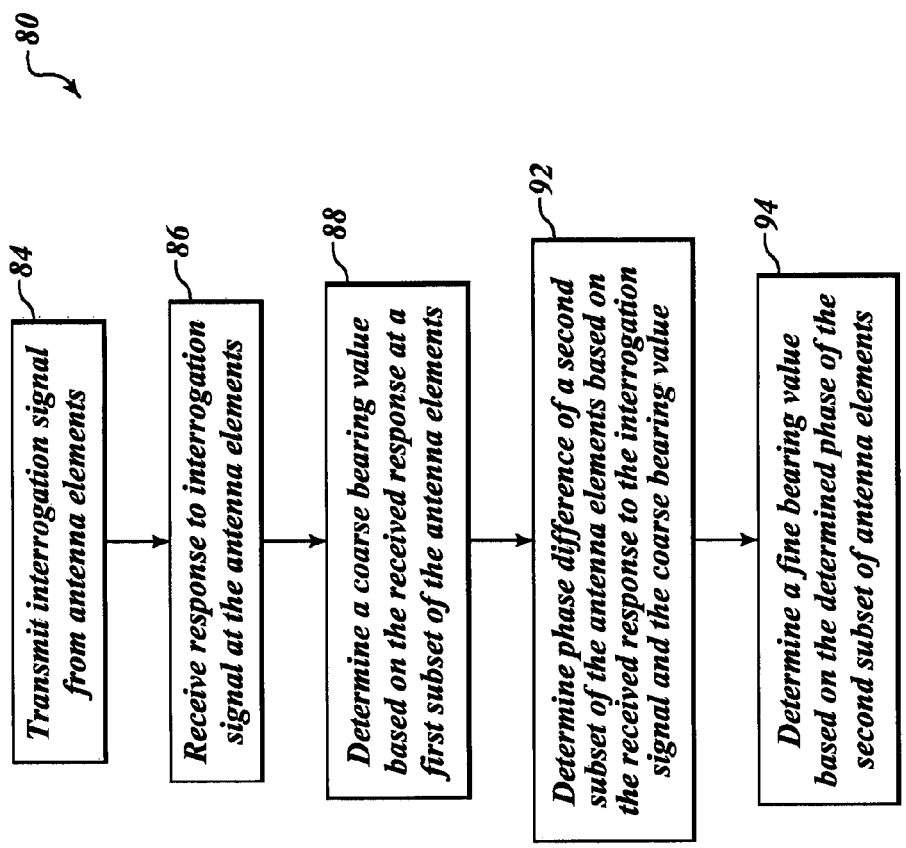
FIG. 3 is a flow diagram of an exemplary process performed by the system shown in FIG. 1.

FIG. 3 shows a flowchart of an exemplary process 80 performed by the system shown in FIG. 1 using the antenna configuration shown in FIG. 2. First, at a block 84, an interrogation signal is transmitted from any one of the antenna elements. At a block 86, a response to the interrogation signal is received at the antenna elements. Next, at a block 88, a coarse bearing value determined based on the received response at a first subset of the antenna elements. The coarse bearing value is derived from the phase difference values of the first subset elements. At a block 92, a phase difference of a second subset of the antenna elements is determined based on the received response to the interrogation signal and the coarse bearing value. Finally, at a block 94, a fine bearing value is determined based on the determined phase of the second subset of antenna elements.

The idea for improving the TCAS bearing measurement is to modify the existing directional antenna by extending the distance between one pair of its elements ($E_{B1}$ and $E_{B3}$; $E_{T1}$ and $E_{T3}$) with one antenna being a directional antenna and one being an omni-blade non-directional antenna.

$E_{B1}$ and $E_{B2}$ (or $E_{T1}$ and $E_{T2}$) determine phase deviation in sine component $\phi_{12}=K\sin(\beta)$; $E_{B1}$ and $E_{B4}$ (or $E_{T1}$ and $E_{T4}$) determine phase deviation in cosine component $\phi_{14}=K\cos(\beta)$; a coarse bearing can thus be determined, $\beta=\tan^{-1}(K\sin(\beta)/K\cos(\beta))$. U.S. Pat. No. 5,122,808 discloses similar bearing determinations and is hereby incorporated by reference.

By example, $E_{B1}$ and $E_{B3}$ measure phase difference $\phi_{13m} \in (-\pi, \pi)$. When considering the solutions in the first bearing quadrant $(-\pi/4, \pi/4)$, the actual phase difference can be, $\phi_{13} = \{2\pi n + \phi_{13m}, (2n+1)\pi + \phi_{13m}\}$, n=0, 1, 2 ... N–1.

N is the number of wavelengths between $E_1$ and $E_3$.

Within the plane of the aircraft 20, the fine bearing resolutions determined by $\phi_{13}$ can have very high accuracy and the final unambiguity is provided by the coarse bearing value. The same method can apply to the other three quadrants.

The following equations are simplified for fine bearing determination when the target aircraft and antenna array are on the same plane (elevation angle=0).

For bottom antenna, $\beta = \pi/4 - \sin^{-1}(\phi_{13}/2\pi N)$ when coarse bearing falls in $(-\pi/4, 3\pi/4)$, $\beta = 5\pi/4 + \sin^{-1}(\phi_{13}/2\pi N)$ when coarse bearing falls in $(3\pi/4, \pi)$, $\beta = -3\pi/4 + \sin^{-1}(\phi_{13}/2\pi N)$ when coarse bearing falls in $(-\pi, -\pi/4)$.

For top antenna, $\beta = -\pi/4 + \sin^{-1}(\phi_{13}/2\pi N)$ when coarse bearing falls in $(-3\pi/4, \pi/4)$, $\beta = 3\pi/4 - \sin^{-1}(\phi_{13}/2\pi N)$ when coarse bearing falls in $(\pi/4, \pi)$, $\beta = -5\pi/4 - \sin^{-1}(\phi_{13}/2\pi N)$ when coarse bearing falls in $(-\pi, -3\pi/4)$.

In practice, elevation angle should be involved in the calculation of fine bearing, if the fine bearing determination process only associate to top or bottom antenna alone.

If $\phi_{T1T3}$ or $(\phi_{B1B3})$ is available at the same time (through dual interrogation or from different interrogation cycles spaced by short interval), fine bearing can be further determined with $\phi_{B1B3}$ and $\phi_{T1T3}$, and elevation angle is no longer involved in the solution.

$\beta = \pi/4 - \tan^{-1}(\phi_{B1B3}/\phi_{T1T3})$ where coarse bearing $\in (-\pi/4, 3\pi/4)$, $\beta = 5\pi/4 - \tan^{-1}(\phi_{B1B3}/\phi_{T1T3})$ where coarse bearings $\in (3\pi/4, \pi)$, $\beta = -3\pi/4 - \tan^{-1}(\phi_{B1B3}/\phi_{T1T3})$ where coarse bearing $\in (-\pi, -\pi/4)$.

Target elevation angle $e = f(\alpha, \beta, \gamma, r, \Delta alt)$,
where $\alpha$ is the pitch angle of own aircraft,
$\beta$ is the roll angle of own aircraft,
$\gamma$ is the coarse bearing target to own,
r is the range target to own,
$\Delta alt$ is the altitude difference between target to ownship.

Other methods for determining fine bearing, such as by calculating every possible fine bearing by $\phi_{T1T3}$ or $\phi_{B1B3}$ or both, correlating the fine bearings with coarse bearing and finally determining the fine bearing.

In one embodiment, a TCAS 110 (FIG. 4) is used to replace expensive secondary surveillance radar (SSR) for small airports or as a backup surveillance solution at larger airports. The TCAS 110 provides improved fine bearing outputs.

The TCAS 110 includes a processor 112 that is in data communication with an RF Module 114 and a display 116 or other output device. The RF Module 114 is connected to all the elements of a four-element inner antenna array 118 and four-element outer antenna array 120.

The outer antenna array 120 includes four omniblade (or comparable) antenna elements $E_{O1-4}$ that surround the inner antenna array 118 on the same plane. The inner antenna array 118 includes elements $E_{I1-4}$. Spaces between the antenna elements $E_{O1}$ and $E_{O3}$, $E_{O2}$ and $E_{O4}$ are N$\lambda$. The axes determined by the elements $E_{O1}$ and $E_{O3}$, $E_{O2}$ and $E_{O4}$ are perpendicular to each other. The inner antenna array 118 may be a conventional TCAS directional finding antenna.

Figure 4:
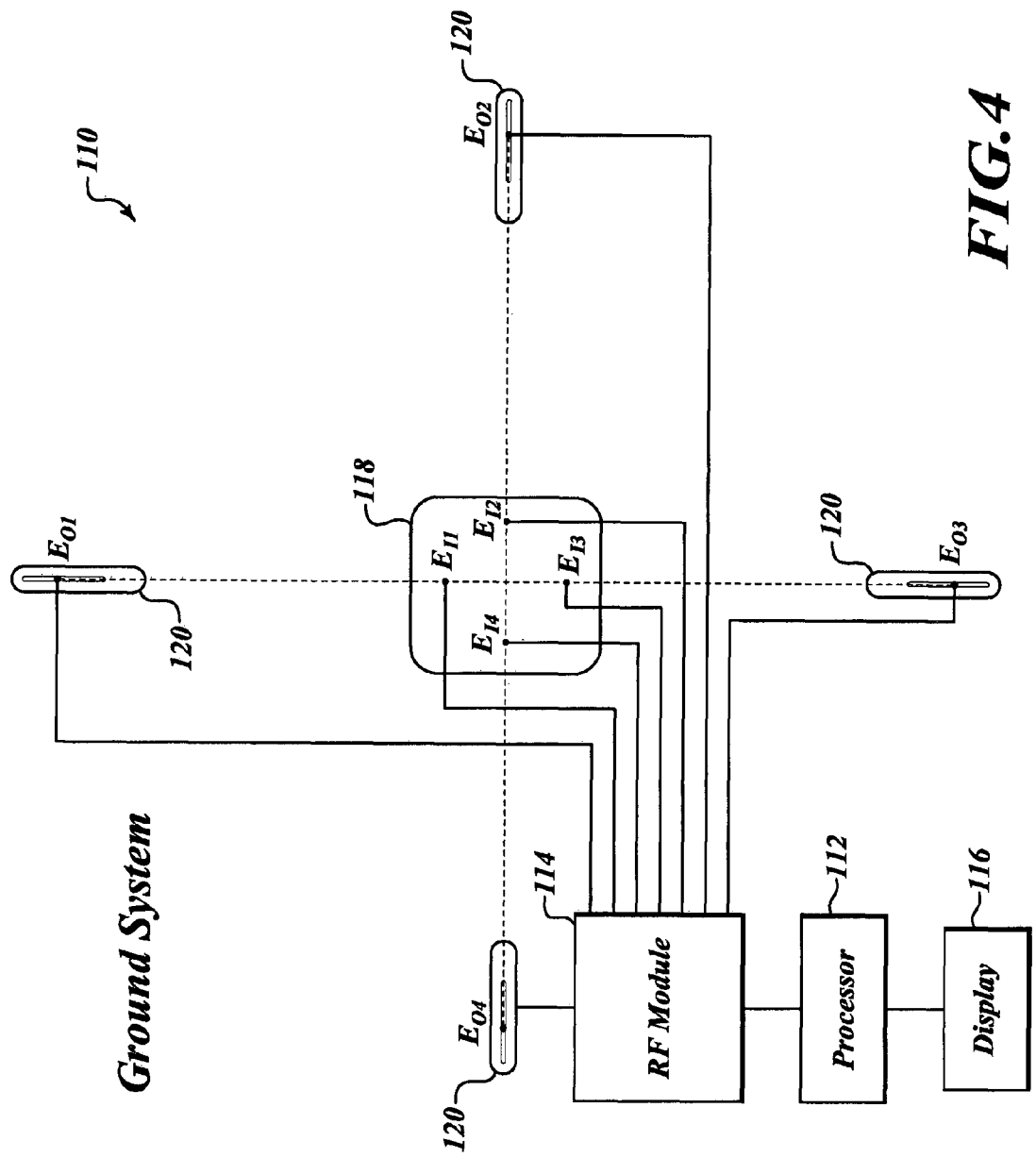
FIG. 4 is a schematic diagram of an exemplary system located on land formed in accordance with the present invention.
Figure 5:
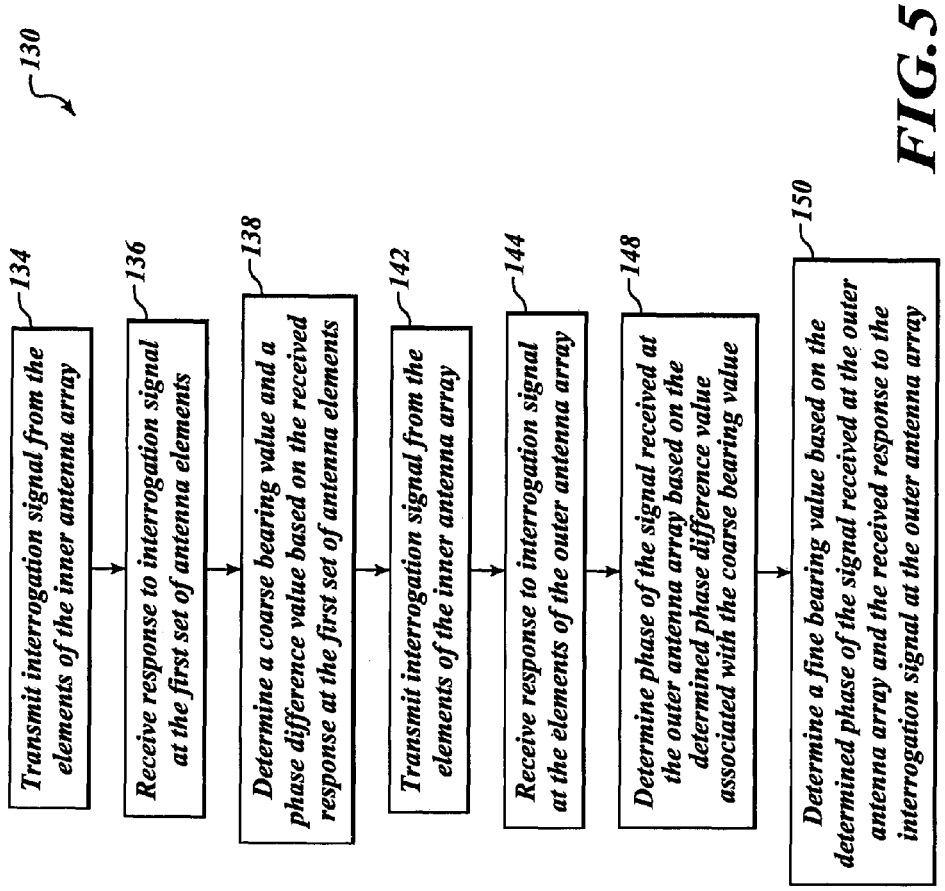
FIG. 5 is a flow diagram of an exemplary process performed by the system shown in FIG. 4.

FIG. 5 shows an exemplary process 130 performed by the TCAS 110 shown in FIG. 4. First, at a block 134, an interrogation signal is transmitted from the inner antenna array 118. The interrogation signal is preferably transmitted from all 4 elements of the inner antenna array 118 for the purpose of directional interrogation capability.

At a block 136, a response to the interrogation signal is received at the first set of antenna elements. Next, at a block 138, a coarse bearing value is determined based on the received response at the inner antenna array 118. Then, at block 142, an interrogation signal is transmitted from the inner antenna array 120. At a block 144, a response to the interrogation signal is received at the outer antenna array 120. Finally, at a block 150, a fine bearing value is determined (disambiguated) from the response received at the outer antenna array 120 based on the coarse bearing value associated with the inner antenna array 118.

In another embodiment, the fine bearing is determined by calculating every possible fine bearing by $\phi_{B1B3}$ and $\phi_{B2B4}$, correlating the fine bearings with coarse bearing and finally determining the fine bearing. Also, the phase measurement pairs are not limited to $\phi_{O1O3}$ and $\phi_{O2B4}$, $\phi_{O1O4}$ and $\phi_{O1O2}$, $E_{O2O1}$ and $E_{O2O3}$, $E_{O2O3}$ and $E_{O4O3}$, and $E_{O1O4}$ and $E_{O3O4}$ can also be used for calculation. Higher precision of antenna mounting and less deformation for ground installation will further elevate the accuracy and alleviate coupling bias.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for determining bearing in a traffic collision avoidance system, the method comprising:
   transmitting a first interrogation signal from at least a portion of an array of antenna elements;
   receiving, by at least a first pair of elements of the array of antenna elements, a first response to the transmitted first interrogation signal from a target, the at least first pair of elements being separated by at most one half of a wavelength ($\lambda$) of a response signal;
   determining, by a processor, a coarse bearing of the received first response;
   receiving, by at least a second pair of elements of the array of antenna elements, a second response to the transmitted first interrogation signal, the at least second pair of elements being separated by approximately N$\lambda$ of the response signal, N being an integer not equal to zero; and
   determining, by the processor, a first bearing value for the target based on the coarse bearing and the received second response.

2. The method of claim 1, wherein the at least first pair of elements comprises two pair of elements, the two pair of elements sharing a common element, wherein axes linking elements in each of the two pair of elements are perpendicular to each other, and wherein the at least second pair of elements comprises a single pair of elements, one of the elements of the single pair of elements of the at least second pair of elements being the common element.

3. The method of claim 2, wherein all the pairs of elements of the array of antenna elements are located in approximately the same plane on an aircraft.

4. The method of claim 3, further comprising:
transmitting a second interrogation signal from a second array of antenna elements;
receiving, by at least a first pair of elements of the second array of antenna elements, a third response to the transmitted second interrogation signal from a target, the at least first pair of elements of the second array of antenna elements being separated by at most ½λ of the response signal;
determining, by the processor, a coarse bearing of the received third response;
receiving, by at least a second pair of elements of the second array of antenna elements, a fourth response to the transmitted second interrogation signal, the at least second pair of elements of the second array of antenna elements being separated by approximately Nλ of the response signal, N being an integer not equal to zero;
determining, by the processor, a second bearing value for the target based on the coarse bearing associated with the received third response and the received fourth response; and
determining, by the processor, a third bearing value based on a phase difference derived from the second bearing value and a phase difference derived from the first bearing value.

5. The method of claim 4, wherein the at least first pair of elements of the second array of antenna elements comprises two pair of elements, the two pair of elements of the second array of antenna elements sharing a common element, wherein axes linking elements in each of the two pair of elements of the second array of antenna elements are perpendicular to each other, and wherein the at least second pair of elements of the second array of antenna elements comprises a pair of elements, one of the elements of the pair of elements of the at least second pair of elements of the second array of antenna elements being the common element.

6. The method of claim 5, wherein the pairs of elements of the at least first pair of elements of the second array of antenna elements and of the at least second pair of elements of the second array of antenna elements are located in approximately the same plane on an aircraft, wherein the first array of antenna elements is located on a top of the aircraft and the second array of antenna elements is located on a bottom of the aircraft.

7. The method of claim 1, wherein the at least first pair of elements of the array of antenna elements comprises two pair of elements being separated by at most ½λ of the response signal and wherein the at least second pair of elements of the array of antenna elements comprises two pair of elements being separated by approximately Nλ of the response signal, N being an integer not equal to zero.

8. The method of claim 7, wherein the first and second pairs of elements of the array of antenna elements are located in the same plane.

9. The method of claim 8, wherein the first and second pairs of elements of the array of antenna elements are located on the ground and the second pair of elements surrounds the first pair of elements.

10. A system comprising:
an array of antenna elements comprising at least a first pair of elements and at least a second pair of elements, the at least first pair of elements are separated by at most one half of a wavelength (λ) of a response signal, the at least second pair of elements are separated by approximately Nλ of the response signal, N being an integer not equal to zero;
a means for transmitting a first interrogation signal from at least a portion of the array of antenna elements;
a means for receiving a first response to the transmitted first interrogation signal from a target at the at least first pair of elements;
a processor configured to determine a coarse bearing of the received first response; and
a means for receiving a second response to the transmitted first interrogation signal at the at least second pair of elements,
wherein the processor is further configured to determine a first bearing value for the target based on the determined coarse bearing and the received second response.

11. The system of claim 10, wherein the at least first pair of elements comprises two pairs of elements, the two pairs of elements share a common element, wherein axes linking elements in each of the two pairs of elements are perpendicular to each other, and wherein the at least second pair of elements comprises a pair of elements, one of the elements of the pair of elements of the at least second pair of elements being the common element.

12. The system of claim 11, wherein all the pairs of the at least first pair of elements and the at least second pair of elements are located in approximately in the same plane on an aircraft.

13. The system of claim 12, further comprising:
a second array of antenna elements comprising at least a first pair of elements and at least a second pair of elements, the at least first pair of elements are separated by at most ½λ of a response signal, the at least second pair of elements are separated by approximately Nλ of the response signal, N being an integer not equal to zero;
a means for transmitting a second interrogation signal from at least a portion of the second array of antenna elements;
a means for receiving a third response to the transmitted second interrogation signal from a target at the at least first pair of elements of the second array of antenna elements;
a means for receiving a fourth response to the transmitted second interrogation signal at the at least second pair of elements of the second array of antenna elements; and
a processor configured to:
determine a coarse bearing of the received third response;
determine a second bearing value for the target based on the determined coarse bearing associated with the second array of antenna elements and the received fourth response; and
determine a third bearing value based on a phase difference derived from the second bearing value and a phase difference derived from the first bearing value.

14. The system of claim 13, wherein the at least first pair of elements of the second array of antenna elements comprises two pairs of elements, the two pairs of elements of the second array of antenna elements share a common element, wherein axes linking elements in each of the two pairs of elements of the second array of antenna elements are perpendicular to each other, and wherein the at least second pair of elements of the second array of antenna elements comprises a pair of elements, one of the elements of the pair of elements of the at least second pair of elements being the common element.

15. The system of claim 14, wherein the pairs of elements of the at least first pair of elements of the second array of antenna elements and of the at least second pair of elements of the second array of antenna elements are located in approximately the same plane on an aircraft, wherein the first array of antenna elements is located on a top of the aircraft and the second array of antenna elements is located on a bottom of the aircraft.

16. The system of claim 10, wherein the at least first pair of elements of the array of antenna elements comprises two pairs of elements being separated by at most ½λ of the response signal and wherein the at least first pair of elements of the array of antenna elements comprises two pairs of elements being separated by approximately Nλ of the response signal, N being an integer not equal to zero.

17. The system of claim 16, wherein the first and second pair of elements of the array of antenna elements are located in the same plane.

18. The system of claim 17, wherein the first and second pair of elements of the array of antenna elements are located on the ground.

19. The method of claim 1, wherein the first response and the second response are determined based on a single response from the target.

20. The method of claim 4, wherein the first interrogation signal and the second interrogation signal are portions of a single interrogation signal.

\* \* \* \* \*